United States Patent [19]
Klyce

[11] 4,124,919
[45] Nov. 14, 1978

[54] CASING TRANSPORT APPARATUS

[75] Inventor: Thomas A. Klyce, Memphis, Tenn.

[73] Assignee: Ranger Tool Company, Inc., Memphis, Tenn.

[21] Appl. No.: 811,186

[22] Filed: Jun. 29, 1977

[51] Int. Cl.$^2$ .................................................. A22C 11/00
[52] U.S. Cl. .................................................. 17/1 F; 83/100
[58] Field of Search ........................ 17/1 F, 49; 83/100

[56] References Cited

U.S. PATENT DOCUMENTS

| | | | |
|---|---|---|---|
| 1,986,725 | 1/1935 | Granstedt | 83/100 |
| 2,010,078 | 8/1935 | Hale | 83/100 X |
| 2,514,660 | 7/1950 | McClure et al. | 17/1 F |
| 2,707,028 | 4/1955 | Burton | 83/100 |
| 3,312,995 | 4/1967 | Garey | 17/1 F |

Primary Examiner—J. M. Meister

[57] ABSTRACT

An apparatus for use in transporting peeled frankfurter casings or the like from a typical frankfurter peeling device or the like to a station such as a garbage dump or the like where the casings are to be finally deposited. A vacuum source creates a vacuum to pull the peeled casings through a conduit which extends from the peeling device, over the garbage dump or the like, and to the vacuum source. The apparatus is adapted to divert the peeled casings from moving through the conduit towards the vacuum source to falling from the conduit to the garbage dump or the like when the casings pass over the conduit.

8 Claims, 10 Drawing Figures

CASING TRANSPORT APPARATUS

BACKGROUND OF THE INVENTION

1. Field of the Invention

This invention relates generally to the frankfurter or the sausage making industry and specifically to the way in which frankfurter casings or the like are transported from the devices which peel the casings from the frankfurters or the like.

2. Background of the Invention

In the manufacture of frankfurters, sausages, wieners or the like, the meat product is typically enclosed within a casing of plastic or the like. After the meat product is cooked, the casing is usually removed therefrom and thrown away. Currently, the casings are usually deposited in containers adjacent the devices which strip or peel the casings from the meat product. These containers are subsequently moved to a station such as a garbage dump where the casings are to be finally deposited.

SUMMARY OF THE INVENTION

The present invention is directed towards overcoming the problems and disadvantages of prior ways of transporting frankfurter casings and the like from the devices which peel the casings from the frankfurters or the like. The concept of the present invention is to provide an apparatus which transports the casings from a station where the casings are peeled from the frankfurters or the like to a station where the peeled casings are to be finally deposited.

The apparatus for transporting frankfurter casings or the like of the present invention comprises, in general, a vacuum source for selectively creating a vacuum; a conduit means having a first end operatively communicated with the vacuum source and having a second end positioned adjacent the station where the casings are peeled from the frankfurters for directing the vacuum created by the vacuum source against the peeled casings to pull the peeled casings through the conduit means and towards the vacuum source; and a diverting means positioned above the station where the peeled casings are to be finally deposited and operatively coupled to the conduit means for diverting the peeled casings moving through the conduit means towards the peeled casings from the vacuum source to moving toward the station where the peeled casings are to be finally deposited.

DESCRIPTION OF THE PREFERRED EMBODIMENT

Figure 1:
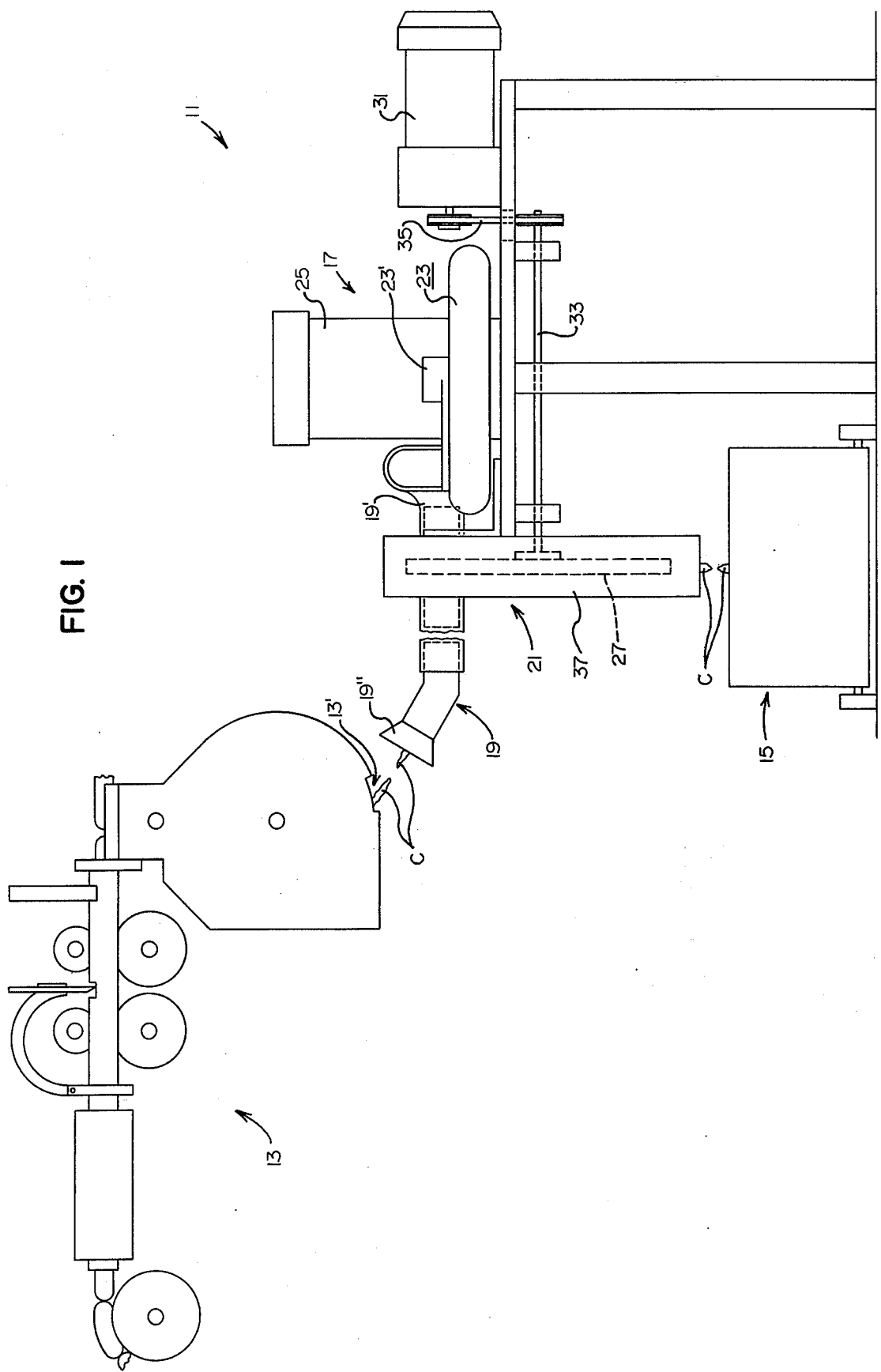
FIG. 1 is a somewhat diagrammatic side elevational view of the casing transport apparatus of the present invention shown operatively associated with a frankfurter peeling device and a garbage dump.
Figure 2:
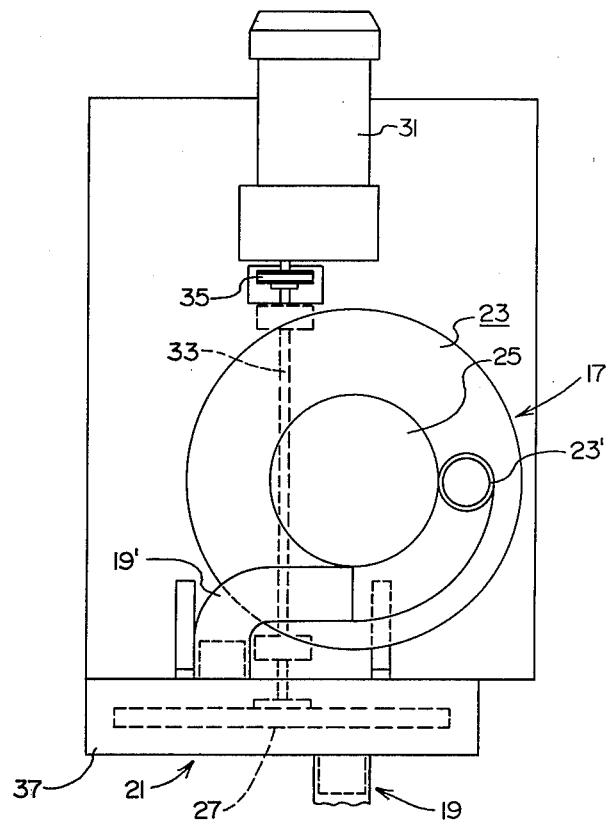
FIG. 2 is a top plan view of a portion of the casing transport apparatus of the present invention.

The casing transport apparatus 11 of the present invention is for use to transport frankfurter casings C or the like from a typical frankfurter peeling device 13 (see, for example, U.S. Pat. No. 3,895,414) or the like to a station such as a garbage dump 15 where the casings C are to be finally deposited (see, in general, FIG. 1). The apparatus 11 of the present invention includes, in general, a vacuum source 17, a conduit means 19 operatively communicated with the vacuum source 17, and a diverting means 21 operatively coupled to the conduit means 19. The vacuum source 17 selectively creates a vacuum to cause casings C to be pulled through the conduit means 19. The diverting means 21 diverts the movement of the casings C from moving through the conduit means 19 towards the vacuum source 17 to moving towards the garbage dump 15 in a manner as will hereinafter become apparent.

The vacuum source 17 may consist of any means known to those skilled in the art for selectively creating a vacuum. For example, the vacuum source 17 may include a well known vortex-type vacuum pump 23 and a typical electric motor 25 or the like for driving the vacuum pump 23 in such a manner so as to create a vacuum or suction at the inlet 23' of the vacuum pump 23 as will be apparent to those skilled in the art.

The conduit means 19 has a first end 19' operatively communicated with the vacuum source 17 and has a second end 19" positioned adjacent the station where the casings C are peeled from the frankfurters or the like. For example, the first end 19' of the conduit means 19 may be attached to the inlet 23' of the vacuum pump 23 of the vacuum source 17 and the second end 19" of the conduit means 19 may be positioned substantially directly below the peeled casing outlet 13' of a typical frankfurter peeling device 13 or the like. Thus, when the vacuum source 17 is activated to create a vacuum, the conduit means 19 will direct the vacuum so created against the peeled casings C being discharged from the outlet 13' of the peeling device 13 to pull the peeled casings C through the conduit means 19 and towards the vacuum source 17 as will now be apparent to those skilled in the art. It should be noted that the second end 19" may be substantially funnel-shaped as clearly shown in FIG. 1 for aiding the entry of the peeled casings C into the conduit means 19. The conduit means 19 may be of great length (for example, 200 feet or more) for extending from the peeling device 13 to the garbage dump 15 where the peeled casings C are to be finally deposited. It should be noted that the term "garbage dump" is used in this specification as meaning a permanent dump such as a land fill or the like or a container such as the well known wheeled garbage carts in which garbage such as the peeled casings C are dumped only to be subsequently removed by public or private sanitation workers or the like to a permanent land fill, waste disposal plant, or the like. In other words, the term "garbage dump" is herein used as meaning the station where the peeled casings C are to be finally deposited by the frankfurter manufacturing process even though others, not associated with the frankfurter manufacturing process, may subsequently move the casings C to another, more permanent location. The conduit means 19 may be formed partially of a length of stainless steel tubing or the like having an interior diameter of a size sufficient to receive the peeled casings C without clogging, and may be formed partially of rubber tubing or the like to accommodate any vibration or the like which may develop in the conduit means 19 where the conduit means 19 is coupled to other components such as the vacuum source 17.

Figure 3:
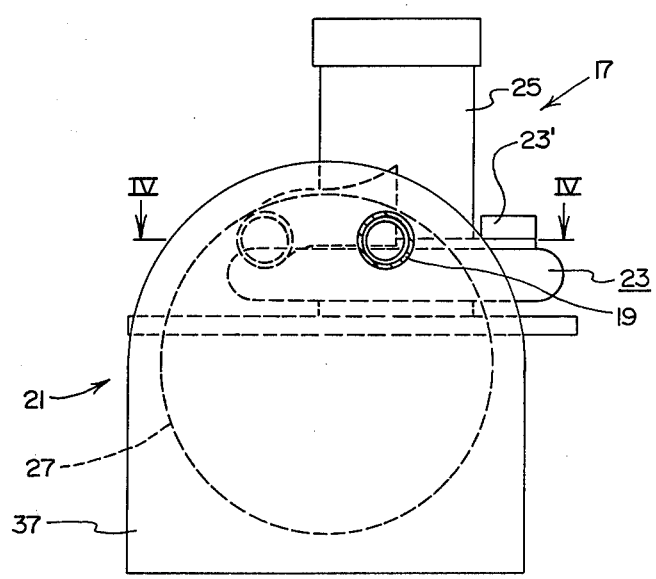
FIG. 3 is an end elevational view of FIG. 2.
Figure 4:
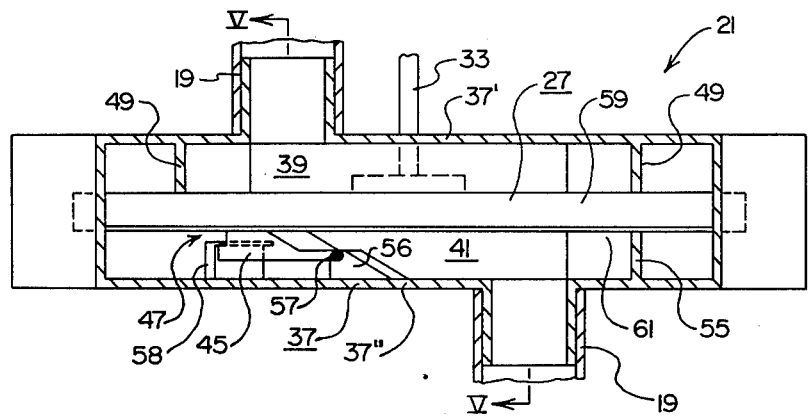
FIG. 4 is a sectional view of a portion of the casing transport apparatus as taken on line IV—IV of FIG. 3.
Figure 5:
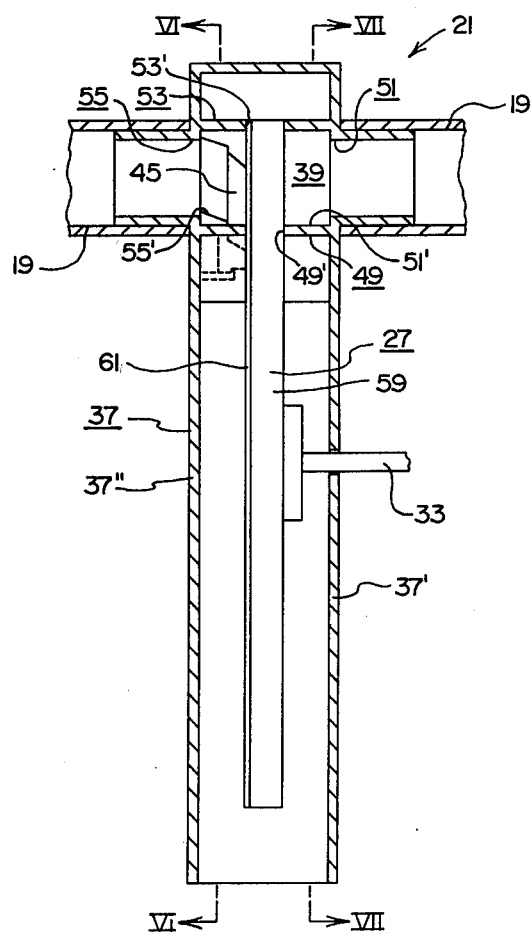
FIG. 5 is a sectional view of a portion of the casing transport apparatus of the present invention as taken on line V—V of FIG. 4.
Figure 6:
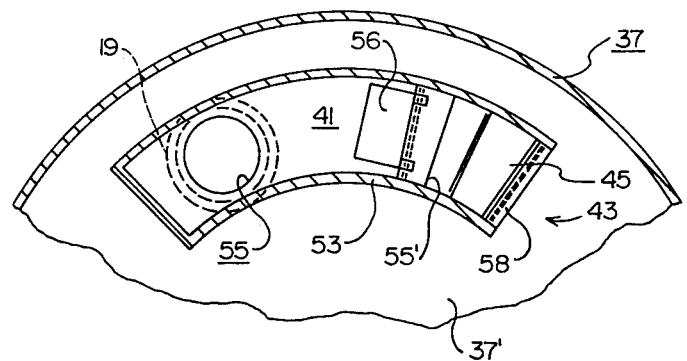
FIG. 6 is a sectional view of a portion of the casing transport apparatus of the present invention as taken on line VI—VI of FIG. 5.
Figure 7:
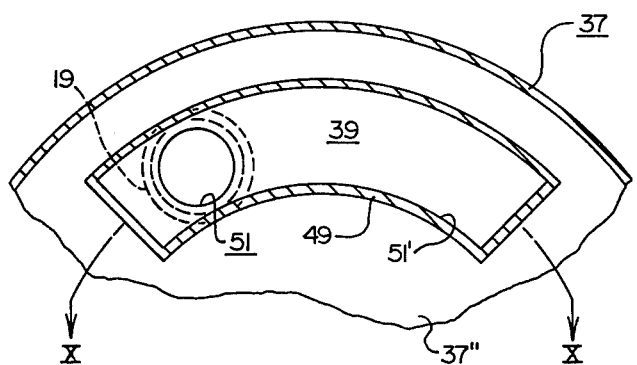
FIG. 7 is a sectional view of a portion of the casing transport apparatus of the present invention as taken on line VII—VII of FIG. 5.
Figure 8:
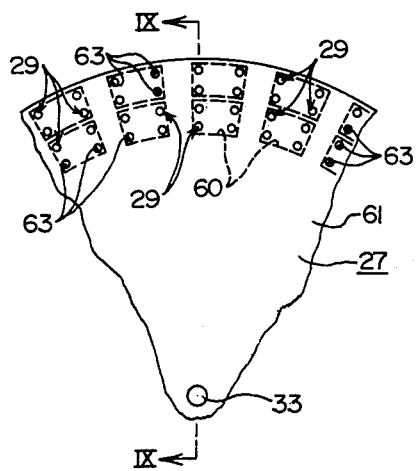
FIG. 8 is an end elevational view of a portion of the diverting means of the casing transport apparatus of the present invention.
Figure 9:
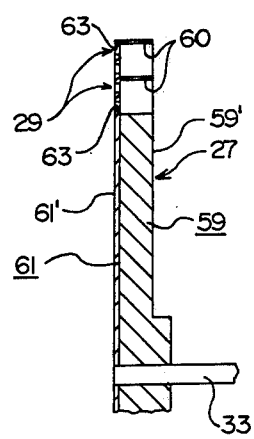
FIG. 9 is a sectional view of a portion of the casing transport apparatus of the present invention as taken on line IX—IX of FIG. 8.
Figure 10:
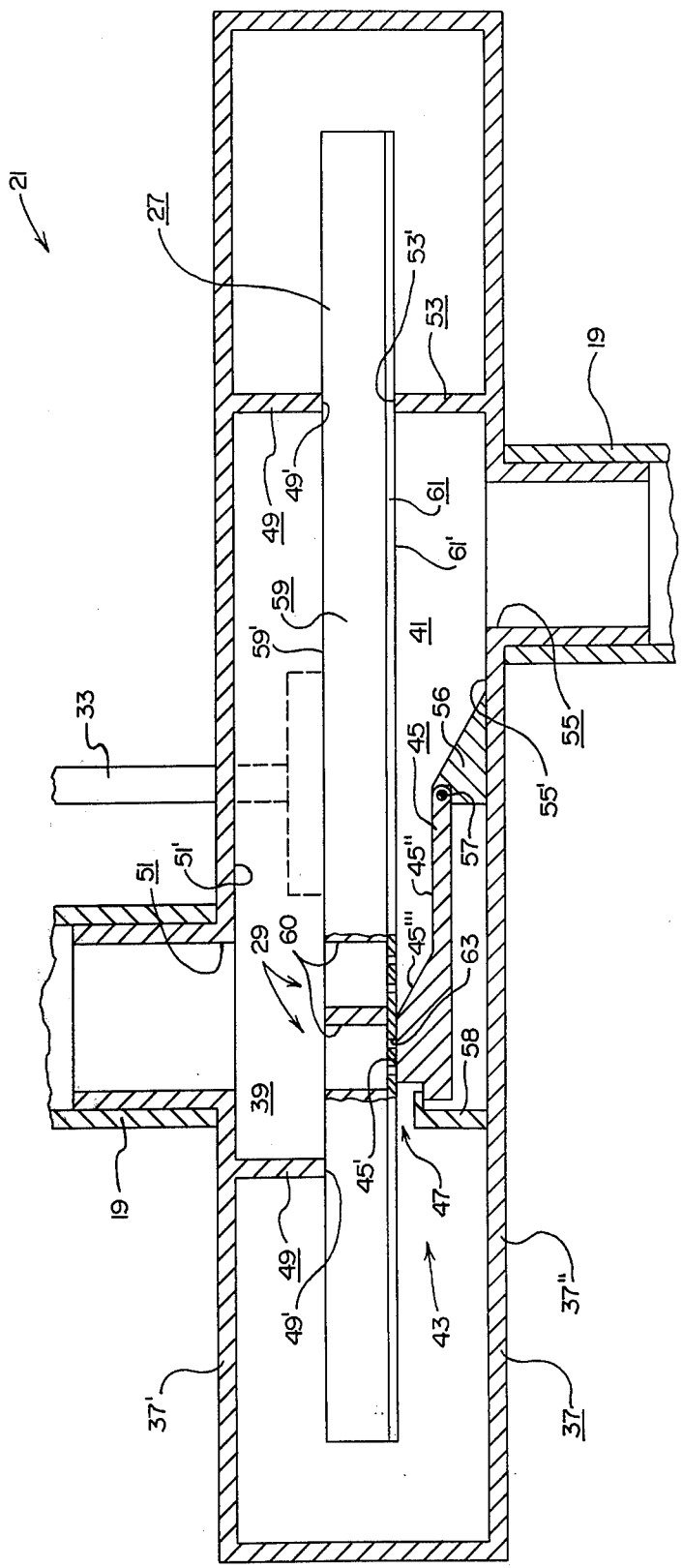
FIG. 10 is a sectional view of a portion of the casing transport apparatus of the present invention substantially as taken on line X—X of FIG. 7.

The diverting means 21 is positioned above the garbage dump 15 and is operatively coupled to the conduit means 19 for diverting the movement of the peeled casings C through the conduit means 19 from moving towards the vacuum source 17 to moving towards the garbage dump 15 where the casings C are to be finally deposited. The diverting means 21 preferably includes a disk means 27 (see, in general, FIGS. 4, 5, 8 and 9). The disk means 27 is substantially larger in area than the cross-sectional area of the conduit means 19 and is positioned transversely across the conduit means 19 to block passage of the peeled casings C through the conduit means 19 (see, in general, FIGS. 1, 2, 3, 4 and 5). The disk means 27 has a plurality of apertures 29 (see FIGS. 8 and 9) for allowing the vacuum created by the vacuum source 17 to extend therethrough in a manner as will be apparent to those skilled in the art. The apertures 29 are smaller in size than the peeled casings C to block the passage of the peeled casings C through the conduit means 19. Thus, when the peeled casings C are pulled through the conduit means 19 towards the vacuum source 17, they will be held against the disk means 27 by the vacuum created by the vacuum source 17 extending through the apertures 29 as will be apparent to those skilled in the art. The diverting means 21 also includes means for rotating the disk means 27. For example, the diverting means 21 may include a typical electric motor 31 or the like operatively coupled to the disk means 27 in any well known manner such as by the shaft 33 and belt 35 arrangement shown in FIG. 1 to rotate the disk means 27 counterclockwise as viewed in FIG. 3. The diverting means 21 also preferably includes a housing means 37 having first and second side plate members 37', 37" positioned about the disk means 27 (see, in general, FIGS. 1, 4 and 5). The housing means 37 has means for defining a first vacuum chamber 39 on the side of the disk means towards the vacuum source 17 (see, in general, FIGS. 4, 5 and 7), and has means for defining a second vacuum chamber 41 on the side of the disk means 27 away from the vacuum source 17 (see, in general, FIGS. 4, 5 and 6). The first and second vacuum chambers 39, 41 are larger in cross-sectional area than the cross-sectional area of the conduit means 19 as clearly shown in FIGS. 6 and 7. The second vacuum chamber 41 is provided with a normally closed outlet 43 (see FIG. 10) for allowing the casings C to exit therethrough as will hereinafter become apparent. The normally closed outlet 43 may consist of a door member 45 hingeably attached to the housing means 37 so as to be pulled closed by the vacuum created by the vacuum source 17 to substantially close an opening 47 in the second vacuum chamber 41 substantially as shown in FIG. 10. The first and second vacuum chambers 39, 41 may be substantially arcuate in shape as shown in FIGS. 6 and 7. The means for defining the first vacuum chamber 39 may include a wall-like member 49 positioned on the first side plate member 37' of the housing means 37 as clearly shown in FIGS. 4, 5 and 6. The wall-like member 49 has a face portion 49' positioned substantially conterminously (i.e., in substantial contact) with the disk means 27. More specifically, the face portion 49' of the wall-like member 49 is positioned close enough to the disk means 27 so that the vacuum created by the vacuum source 17 will not escape, or pass, through the space between the wall-like member 49 and the disk means 27 but not so close as to hinder movement of the disk means 27 relative to the wall-like means 49. For example, the face portion 49' of the wall-like member 49 may be positioned approximately seven thousandths of an inch (0.01778 centimeters) away from the disk means 27. An aperture 51 extends through the first side plate member 37'. The conduit means 19 is operatively communicated with the aperture 51. The wall-like member 49 defines an enlarged cavity portion 51' about the aperture 51 for demarcating the first vacuum chamber 39. The means for defining the second vacuum chamber 41 may include a wall-like member 53 positioned on the second side plate member 37" of the housing means 37 as clearly shown in FIGS. 4, 5 and 7. The wall-like member 53 has a face portion 53' positioned substantially conterminously (i.e., in substantial contact) with the disk means 27. More specifically, the face portion 53' of the wall-like member 53 is positioned close enough to the disk means 27 so that the vacuum created by the vacuum source 17 will not escape, or pass, through the space between the wall-like member 53 and the disk means 27 but not so close as to hinder movement of the disk means 27 relative to the wall-like member 53. For example, the face portion 53' of the wall-like member 53 may be positioned approximately seven thousandths of an inch (0.01778 centimeters) away from the disk means 27. An aperture 55 extends through the second side plate member 37". The conduit means 19 is operatively communicated with the aperture 55. The wall-like member 53 defines an enlarged cavity portion 55' about the aperture 55 (see, in general, FIG. 6) for demarcating the second vacuum chamber 41. The wall-like member 53 is not continuous. Rather, there is an opening or gap in the wall-like member 53 for defining or demarcating the opening 47. The door member 45 is provided to normally close this gap so as to allow a vacuum to exist in the second vacuum chamber 41 and to allow the vacuum in the second vacuum chamber 41 to be directed to the second end 19" of the conduit means 19 adjacent the station where the casings C are peeled from the frankfurters or the like. The door member 45 has a first face portion 45' for being normally held substantially conterminously (i.e., in substantial contact) with the disk means 27 (see FIG. 10), has a second face portion 45" spaced away from the disk means 27 a distance which allows casing C to be received between the disk means 27 and the second face portion 45", and has a sloping portion 45" extending between the first and second face portions 45', 45". The door member 45 may be hingeably mounted to the housing means 37 within the second vacuum chamber 41 by way of a hinge body 56 fixedly attached to the second side plate member 37" of the housing means 37 within the second vacuum chamber 41 and a pivot pin 57 passing through the hinge body 56 and the door member 45 (see, in general, FIG. 10). A spring (not shown) may be provided to help maintain the door member 45 closed (i.e., to aid the vacuum created in the second vacuum chamber 41 in holding the first face portion 45' of the door member 45 substantially conterminously with the disk means 27). A stop member 58 may be provided to prevent the door member 45 from engaging the disk means 27 (see, in general, FIG. 10). The stop member 58 may extend into the opening 47 thereby reducing the effective size of the opening 47, but does not completely close the opening 47 so as to allow casings C to pass through the opening 47. It should be noted that at least the enlarged cavity portions 51', 55' are larger in cross-sectional area than the cross-sectional area of the conduit means 19 as clearly shown in FIGS. 4, 6, 7 and 10.

The disk means 27 may include a first disk member 59 having a plurality of apertures 60 therethrough and may include a second disk member 61 attached to the first disk member 59 and having a plurality of apertures 63 therethrough. The apertures 60 through the first disk member 59 are preferably larger than the apertures 63 through the second disk member 61. For example, the first disk member 59 may consist of a 1-inch (2.54 centimeters) metal plate having a plurality of 1-inch (2.54 centimeters) aperture or the like therethrough and the second disk member 61 may consist of screen-like material having a plurality of small apertures therethrough. Such a construction allows a large volume of air to be drawn through the disk means 27 without allowing the casings C to pass through or become trapped in the apertures through the disk means 27. The first disk member 59 has a face portion 59' directed towards the vacuum source 17. The second disk member 61 has a face portion 61' directed away from the vacuum source 17.

The operation of the apparatus 11 of the present invention is quite simple. The apparatus 11 is first positioned with the second end 19" of the conduit means 19 adjacent the peeled casing outlet 13' of the peeling device 13 and with the diverting means 21 positioned over the garbage dump 15 substanially as shown in FIG. 1. The vacuum source 17 is then activated to cause any casing C discharged through the outlet 13' of the peeling device 13 to be pulled into the conduit means 19 and towards the vacuum source 17. When the casing C encounters the disk means 27, it is held thereagainst by the force of the vacuum created by the vacuum source 17. As the disk means 27 rotates in response to the motor 31 or the like, the casing C held against the disk means 27 will also rotate. The casings C will cause the door member 45 to open a sufficient amount to allow the casings C to pass through the opening 47 of the normally closed outlet 43. As the casings C pass out the second vacuum chamber 41 through the opening 47 of the normally closed outlet 43, they will fall from the disk means 27 and to the garbage dump 15.

Although the invention has been described and illustrated with respect to a preferred embodiment thereof, it is not to be so limited since changes and modifications may be made therein which are within the full intended scope of the invention.

I claim:

1. Apparatus for transporting frankfurter casings or the like from a station where the casings are peeled from the frankfurters or the like to a station where the peeled casings are to be finally deposited, said apparatus comprising:
   (a) a vacuum source for selectively creating a vacuum;
   (b) conduit means having a first end operatively communicated with said vacuum source and having a second end positioned adjacent said station where the casings are peeled from the frankfurters for directing said vacuum created by said vacuum source against the peeled casings to pull the peeled casing through said conduit means towards said vacuum source; and
   (c) diverting means positioned above the station where the peeled casings are to be finally deposited and operatively coupled to said conduit means for diverting the movement of the peeled casings through said conduit means from said vacuum source to the station where the peeled casings are to be finally deposited, said diverting means including blockage means for blocking passage of the peeled casings through said conduit means, said blockage means having first and second portions for sequential alignment with said conduit means, said diverting means including means for moving said first and second portions of said blockage means sequentially into and out of alignment with said conduit means.

2. Apparatus for transporting frankfurter casings or the like from a station where the casings are peeled from the frankfurter or the like to a station where the peeled casings are to be finally deposited, said apparatus comprising:
   (a) a vacuum source for selectively creating a vacuum;
   (b) conduit means having a first end operatively communicated with said vacuum source and having a second end positioned adjacent said station where the casings are peeled from the frankfurters for directing said vacuum created by said vacuum source against the peeled casings to pull the peeled casing through said conduit means towards said vacuum source; and
   (c) diverting means positioned above the station where the peeled casings are to be finally deposited and operatively coupled to said conduit means for diverting the movement of the peeled casings through said conduit means from said vacuum source to the station where the peeled casings are to be finally deposited, said diverting means including a disk means, said disk means being substantially larger in area than the cross-sectional area of said conduit means and being positioned transversely across said conduit means to block passage of the peeled casings through said conduit means, said disk means having a plurality of apertures therethrough for allowing said vacuum created by said vacuum source to extend therethrough, said apertures being smaller in size than the peeled casings whereby the peeled casings are pulled through said conduit means towards said vacuum source and held against said disk means by said vacuum created by said vacuum source, and said diverting means including means for rotating said disk means.

3. The apparatus of claim 2 in which said diverting means includes a housing means positioned about said disk means, said housing means having means for defining a first vacuum chamber on the side of said disk means towards said vacuum source, said first vacuum chamber being larger in cross-sectional area than the cross-sectional area of said conduit means, said housing means having means for defining a second vacuum chamber on the side of said disk member away from said vacuum source, said second vacuum chamber being larger in cross-sectional area than the cross-sectional area of said conduit means and having a normally closed outlet for allowing the peeled casings to exit therethrough.

4. The apparatus of claim 3 in which said first and second vacuum chambers are substantially arcuate in shape.

5. The apparatus of claim 3 in which said disk means includes a first disk member having a plurality of apertures therethrough and includes a second disk member attached to said first disk member and having a plurality of apertures therethrough, said apertures through said first disk member being larger in size than said apertures through said second disk member, said first disk member having a face portion directed towards said vacuum source, said second disk member having a face portion directed away from said vacuum source.

6. The apparatus of claim 3 in which said means for defining a first vacuum chamber includes a wall-like member having a face portion positioned substantially conterminously with said disk means and defining an enlarged cavity portion, said conduit means being operatively communicated with said enlarged cavity portion defined by said wall-like member, said enlarged cavity portion being contiguous with said face portion of said wall-like member for demarcating said first vacuum chamber, said enlarged cavity portion being larger in cross-sectional area than the cross-sectional area of said conduit means; and in which said means for defining a second vacuum chamber includes a wall-like member having a face portion positioned substantially conterminously with said disk means and defining an enlarged cavity portion, said conduit means being operatively communicated with said enlarged cavity portion defined by said plate member, said enlarged cavity portion being contiguous with said face portion of said wall-like member for demarcating said second vacuum chamber, at least a portion of said enlarged cavity portion extending to the edge of said wall-like member to define said outlet opening, said enlarged cavity portion being larger in cross-sectional area than the cross-sectional area of said conduit means.

7. An improved peeling apparatus of the type including a peeling device for peeling casings from frankfurters or the like, wherein said improvement comprises: an apparatus for transporting the peeled casings from said peeling device to a substantially remote station where the peeled casings are to be finally deposited, said apparatus comprising:

(a) a vacuum source for selectively creating a vacuum;

(b) conduit means having a first end operatively communicated with said vacuum source and having a second end positioned adjacent said peeling device for directing said vacuum created by said vacuum source against the peeled casings discharged by said peeling device to pull the peeled casings through said conduit means towards said vacuum source; and (c) diverting means positioned above the station where the peeled casings are to be finally deposited and operatively coupled to said conduit means for diverting the movement of the casing through said conduit means from said vacuum source to the station where the casings are to be finally deposited, said diverting means including blockage means for blocking passage of the peeled casings through said conduit means, said blockage means having first and second portions for sequential alignment with said conduit means, said diverting means including means for moving said first and second portions of said blockage means sequentially into and out of alignment with said conduit means.

8. The combination with a frankfurter peeling device of an apparatus for transporting peeled casing from said frankfurter peeling device to a station where the peeled casings are to be finally deposited, said apparatus comprising:

(a) a vacuum source for creating a vacuum;

(b) conduit means having a first end operatively communicated with said vacuum source and having a second end positioned adjacent said peeling device for directing said vacuum created by said vacuum source against the peeled casings discharged by said peeling device to pull the casings through said conduit means and towards said vacuum source; and (c) diverting means positioned above the station where the peeled casings are to be finally deposited and operatively coupled to said conduit means for diverting the movement of the casings through said conduit means from said vacuum source to the station where the casings are to be finally deposited, said diverting means including blockage means for blocking passage of the peeled casings through said conduit means, said blockage means having first and second portions for sequential alignment with said conduit means, said diverting means including means for moving said first and second portions of said blockage means sequentially into and out of alignment with said conduit means.

* * * * *